Oct. 18, 1932.  J. W. WEST  1,883,197
AXLE GAUGE
Filed Feb. 5, 1930   2 Sheets-Sheet 1

INVENTOR.
John Walter West
Katherine Hennings West, Executrix
BY M. C. Frank
ATTORNEY Oct. 18, 1932.   J. W. WEST   1,883,197
AXLE GAUGE
Filed Feb. 5, 1930   2 Sheets-Sheet 2

INVENTOR.
John Walter West
Katherine Hennings West, Executrix
BY M. C. Frank
ATTORNEY.

Patented Oct. 18, 1932

1,883,197

UNITED STATES PATENT OFFICE

JOHN WALTER WEST, DECEASED, LATE OF ALBANY, CALIFORNIA, BY KATHERINE HENNINGS WEST, EXECUTRIX, OF ALBANY, CALIFORNIA

AXLE GAUGE

Application filed February 5, 1930. Serial No. 426,035.

The invention relates to a device for bench-testing the shape and relations of the parts of a vehicle axle for mounting on dirigible wheels.

An object of the invention is to provide gauging apparatus of the class described which is arranged for use to determine the inclination of an axle king-pin hole both for camber and caster determinations.

Another object is to provide in the apparatus means for positively determining the fact of any twist in an axle between spaced spring perches thereof, and for measuring the degree of such twist.

A further object is to provide a particularly simple apparatus whereby the various determinations are in degrees of angle and are readable directly without recourse to correction tables or the like.

The invention possesses other objects and features of advantage, some of which, with the foregoing, will be set forth or be apparent in the following description of a preferred form of the invention which is illustrated in the accompanying drawings, in which.

Figure 1:
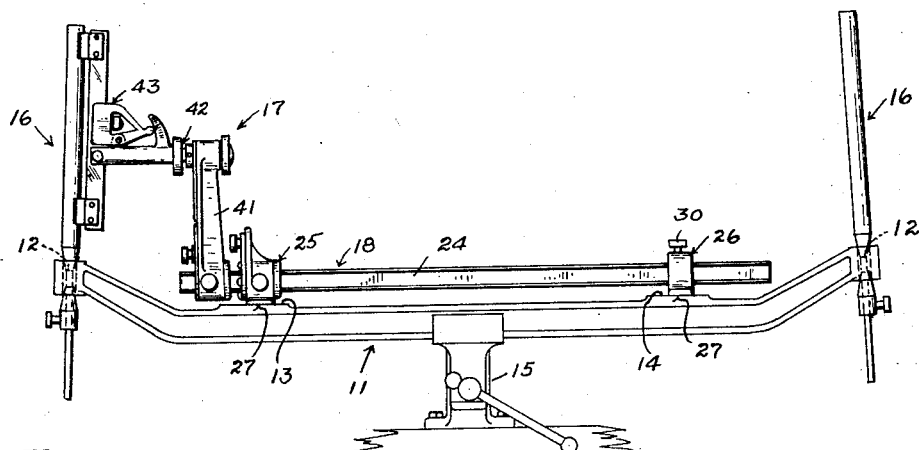
Figure 1 is a front elevation of the apparatus in operative relation to an axle.

As particularly illustrated and hereinafter described, a gauge embodying the present invention is disclosed as applied for certain tests of an automobile axle 11 having the ends thereof providing transverse king-pin holes, or bearings, 12 and provided at an intermediate portion with planar and spaced spring perches 13 and 14. For testing purposes, the axle 11 is shown mounted in a bench-vise 15 with the spring perches uppermost, said perches being usually, and preferably, coplanar. Essentially, the apparatus of the gauge comprises test pins 16 for fixed mounting on the axle to extend axially of the king-pin holes 12, a testing head 17 for application to the test pin 16, and a base 18 for mounting on the spring perches 13 and 14 and supporting the head 17.

Figure 6:
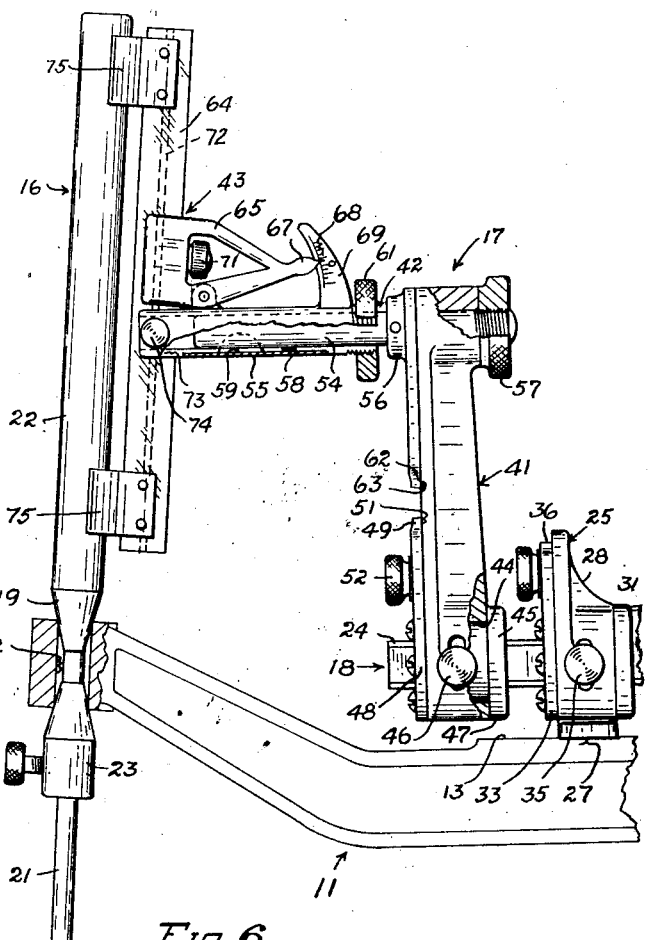
Figure 6 is an enlarged view of a part of the showing of Figure 1, portions of the structure being broken away to show the same in section.

As particularly brought out in Figure 6, the pins 16 are shown as of a usual self-centering type wherein a cylindrical bar has portions of different diameters connected at a conical shoulder 19, the smaller pin portion 21 engaging through a king-pin hole 12, and the larger pin portion 22 being too large to be received in the hole. An axially perforated cone member 23 adjustably mounted on the bar portion 19 at the opposite ends of the bore from the shoulder 19 completes the assembly for securing the extending test-pin portion 22 in fixed and coaxial relation to the king-pin hole 12.

The head-supporting base 18 comprises a bar 24 slidably mounted in base blocks 25 and 26 for engagement with the different spring perches 13 and 14. The under, and perch-engaging faces 27 of the base blocks are either flat or direct and flat engagement with the flat perch surfaces, or may each be provided with three feet defining a supporting plane for the blocks; the former is assumed in the present showing. Since the spring perches 13 and 14 should be mutually coplanar, and their common plane is customarily used as a reference plane for testing and setting the various other axle parts, a primary testing of the spring perches as to their coplanar relation is essential before the other tests may be made, and the base assembly 18 is accordingly arranged for making this test. The blocks 25 and 26 may be clamped in place, or held there solely gravitationally, the latter being assumed in the present instance.

Figure 2:
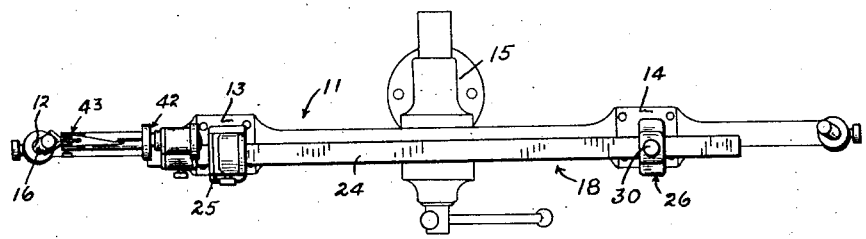
Figure 2 is a plan view of the showing of Figure 1.
Figures 3, 4:
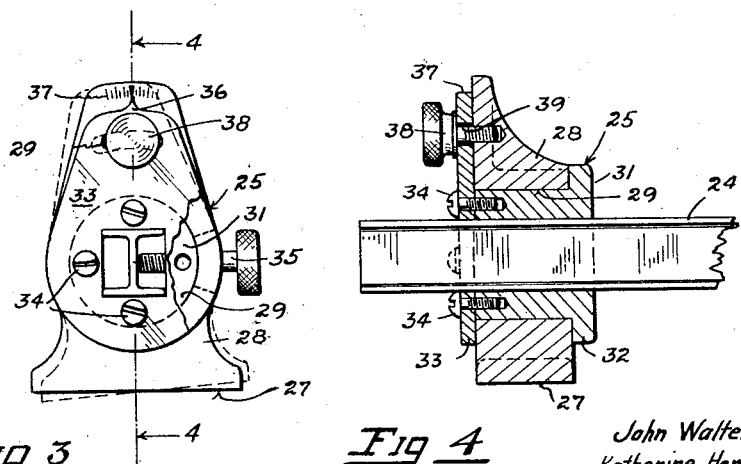
Figure 3 is an enlarged and face view of a perch-engaging base block fixed on a reference bar of the apparatus, a portion of the base block structure being broken away.
Figure 4 is a section at 4—4 in Figure 3.

As particularly shown in Figures 1 and 2, the base bar 24 is of uniform I-beam section and the block 26 is complementarily perforated for slidably and non-rotatably receiving the bar 24 therethrough and in a line parallel to the lower block face 27 and is provided with a set screw 30 for fixing it to the bar. As brought out in Figures 3, 4 and 6 the block 25 is formed with two sections or elements, an outer section 28 providing the bearing surface 27 and a cylindrical bore 29 directed in parallel relation to said surface, and an inner section 31 journalled in the bore 29 and perforated to slidably and non-rotatably receive the bar 24 therethrough. For fixing the section 31 in the bore 29, said section is particularly shown as provided at one end with a radial flange 32 for engaging an opposed end of the section 28, and at the other end with a plate member 33 fixed thereto by means of screw bolts 34 and overlying the other end of the section 28. A set-screw 35 is preferably mounted in and through the inner block section 31 for engagement with the bar web for positively fixing said section in adjusted position on the bar, the outer block section 28 being appropriately slotted circumferentially thereof and at the screw to permit a few angular degrees of relative rotation between the block sections.

It will now be noted that the rocking engagement of the block section 28 with the bar 24, said section comprising the base block proper, permits a simultaneous flat engagement of the bearing faces 27 of the blocks 25 and 26 with the respective spring perches even if said spring perches are not coplanar, and means are provided for determining and measuring any angular deviation between the two perches. Accordingly, and as shown, the plate 33 on the base block section 31 is provided with a pointer 36 and the end face portion of the block 28 over which the pointer 36 moves is provided with an angle scale 37. The pointer 36 is preferably arranged to register with the zero of the scale 37 when the base block surfaces 27, and therefore the perches 13 and 14, are coplanar. In this manner any deviation of the perches 13 and 14 from a coplanar relation and about an axis parallel to that of the axle is positively measurable. If deviation is found, the axle may be twisted to eliminate the same, or allowance may be made in further determinations with the apparatus. A set screw 38 is mounted in the block portion 28 to extend through a slot 39 in the plate 33 for the locking engagement of the head of the screw with the plate to fix the block sections in adjusted relation as such is required or desired.

The head 17, it will now be noted, is arranged for mounting on a protruding end of the base bar 24 and is used in making various tests of the axle end thereat by reference to the test pin 16. Essentially, the head 17 comprises an arm 41 for a pivotal mounting on the bar 24 to extend radially therefrom, a spindle 42 journalled in an end of said arm for rotative adjustment about an axis parallel to the bar axis, and a straight-edge assembly 43 pivoted to the spindle 42 for adjustment in a plane parallel to the spindle axis. Three possible angular adjustments of the straight-edge assembly are thus seen to be provided, said adjustments including the lateral translation of the spindle in an arcuate path about the axis of the bar 24, a rotative adjustment of said assembly about the spindle axis, and a rotative adjustment of the said assembly about an axis perpendicular to that of the spindle. In this manner, the axis of the straight-edge assembly is arranged for disposal in complete parallelism with the axis of the test pin 16 for making the various measurements with the apparatus.

Referring now more specifically to the mounting of the arm 41 on the bar 24 (Figs. 5 and 6), said arm is seen to be provided at the lower end thereof with a cylindrical bore 44 for the journalled reception of a block 45 non-rotatably fixed in set position on the bar 24 by means of a set-screw 46 mounted in the block and engaging the bar web. The block 45 is provided with a radial and integral flange 47 at its inner end, and a flange plate 48 is mounted at the outer end of said block, said flange and flange plate being cooperative to retain the arm end on the block. The arm end portion opposite the set-screw 46 is slotted thereat to permit the required degree of rocking adjustment of the arm about the bar. The plate 48 also provides a pointer 49 for movement over an angle scale 51 provided on the arm, said pointer preferably registering with the zero of said scale when the arm is perpendicular to the plane of the under surface 27 of the base block 26. For setting the arm 41 in adjusted position, a set screw 52 is provided, said screw extending through a slot 53 in the plate 48 and threadedly engaging the arm whereby the screw head is adapted to engage the plate for frictionally gripping the same. It is noted that the structure described for mounting the arm on the bar 24 is similar to, and in part the same as, that for mounting the base block 25 on said bar.

Preferably, and as shown, the spindle 42 is bipartite, with a section 54 telescopically engaged within the section 55. The spindle section 54, which engages through the arm end, carries a collar 56 and is threaded to receive a thumb-nut 57 at the opposite side of said arm end whereby the section may be locked to the arm against rotation in its bearing therein. The tubular spindle section 55, which is axially and slidably adjustable along the section 54, is held against rotation by reason of the engagement in an inner longitudinal groove 58 therein of a key 59 fixed to the section 54; see Figure 6. The end portion of the groove 58 nearest the arm 41 is completed as a slit and the section end at said slit is provided with external and tapered threads for the threaded reception of a locking ring 61 whereby the spindle portion 54 is arranged to be releasably gripped within the said end of the portion 55. In this manner, the effective length of the spindle may be varied without disturbing other relations of the parts.

Means are provided for gauging the rotative position of the spindle in its mounting on the arm. Accordingly, and as shown, a pointer 62 is provided on the spindle collar 56 to extend radially therefrom and for movement across an angle scale 63 provided on the arm 41 adjacent the scale 51 with which the pointer 49 is arranged to register. Preferably, the pointer 62 is arranged to register zero on the scale 63 when the aforesaid straight-edge axis lies in, or is parallel to, the plane defined by the spindle and base bar axes. In this manner, the degree of rotation of said straight-edge axis out of said last plane is arranged to be directly gauged by the reading of the pointer 62 on the scale 63. Preferably, and as shown, the pointers 49 and 62 are of like and maximum lengths whereby to provide for a maximum accuracy of the readings at the scales 51 and 63.

Figure 5:
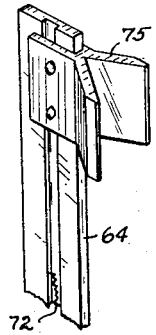
Figure 5 is an enlarged and fragmentary perspective view of a straight-edge blade of the assembly.

The straight-edge assembly 43, it will now be noted, comprises a blade element 64 mounted in a block 65, said block being pivoted to an ear 66 extending radially from the spindle section 55 for rotation about an axis transverse to said spindle. A pointer 67 extends rearwardly from said block for registration with a scale 68 provided on a second ear 69 extending from the spindle section 55 whereby angular displacements of the block and blade may be gauged. The pointer 67 is arranged to register with the zero of the scale 68 when the longitudinal axis of the blade 64 is perpendicular to the spindle axis. It may at times be desirable to shift the blade 64 longitudinally of itself, and said blade is accordingly so mounted in the block 65, a locking screw 71 engaging a groove 72 in one blade side to releasably secure the same in adjusted position in the block 65; the groove 72 is shown in Figure 5, but the exact means of engagement of the screw 71 therewith is not disclosed as such is a common device and is not part of the present invention. The outer end of the spindle portion is axially slit, as at 73, to receive the blade in its various adjusted positions, and a set-screw 74 is mounted in said portion to releasably fix the blade in adjusted position.

To insure accuracy in setting the blade 64 with respect to the test pin 16, V-blocks 75 are mounted at the opposite ends of said blade, the centering axis thus defined paralleling that of the blade 64. It is seen that the assembly 43 actually comprises a V-block assembly and provides for the disposal of its gauging axis in true parallel relation to that of the test-pin 16. It is obvious, however, that other means might be utilized for aligning the gauging axis or line with the test-pin axis without departing from the spirit of the present invention.

Figure 7:
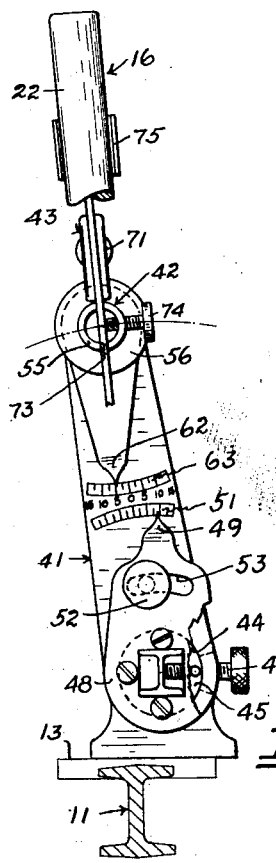
Figure 7 is a left-side elevation of the structure shown in Figure 6, portions of the apparatus and axle being broken away to disclose the relations of caster-measuring elements.

With the apparatus mounted as hereinbefore described and with the gauging line of the blade 64 parallel to the axis of the pin 16, a typical condition might be that shown in Figure 7 wherein different angle readings are seen on the scales 51 and 63 of the arm 41. The existence of said reading difference discloses that the tested king-pin hole of the axle has forward caster with respect to the plane of the spring perch 14 and which is measured by the difference in the readings of the scales 51 and 63. If the readings were alike, the caster would be zero, while if the reading on the scale 63 were larger, the caster would be backward. It is thus seen that caster determinations are directly determinable with the present device.

The camber determination is just as simply arrived at by reading the indication of the pointer 67 on the scale 68, it being understood that a spindle body (not shown) to be pivoted at a hole 12 by means of a king-pin (not shown) would have the wheel spindle thereof so angularly related to its pivotal axis as to dispose the spindle to slope downwardly toward its outer end.

The present apparatus is to be used interchangeably at the two ends of the axle and with the same or like test pins whereby differences in any of the readings taken on the scales 51, 63 or 68 will indicate a lack of symmetry in the axle shape whereby measures may be taken to correct the difference. Among relations of the latter class may be mentioned the heights of the axle ends with respect to a spring perch plane, and the forward or back displacement of the said axle ends with respect to the intermediate axle portion which provides the spring perches. The latter determinations are, of course, actually referred to the hole portions of the axle ends rather than to the external outlines thereof, and are therefore particularly accurate.

From the foregoing description taken in connection with the accompanying drawings, the advantages of the construction and method of operation will be readily understood by those skilled in the art to which the invention appertains, and while having described the principle of operation, together with the device which is now considered to be the best embodiment thereof, it is desired to have it understood that the device shown is merely illustrative, and that such changes may be made, when desired, as fall within the scope of the appended claims.

Having thus described the invention, it is claimed as new and desired to secure by Letters Patent of the United States the following:

1. In a gauge for an axle having a king-pin hole and a pair of spaced and planar spring perches, a test pin adapted to be fixedly mounted on said axle to extend axially of said hole, a base bar adapted to be mounted on said spring perches, a testing head providing a member arranged for adjusted positioning to have an axis thereof parallel to the axis of said test pin, said head also including an arm pivoted to said bar for angular adjustment about the axis thereof and supporting said head for the aforesaid adjusted positioning of said head member with respect to said test pin, and means associated with said head to determine the angularity of said arm with respect to the plane of a said perch.

2. In a gauge for an axle having a king-pin hole and a pair of spaced and planar spring perches, a test pin adapted to be fixedly mounted on said axle to extend axially of said hole, a base bar adapted to be mounted on said spring perches, a testing head providing a member arranged for adjusted positioning to have an axis thereof parallel to the axis of said test pin, said head also including an arm pivoted to said bar for angular adjustment about the axis thereof in a plane perpendicular to said axis and supporting said head for adjustment with respect thereto in a line parallel to the bar axis, said member being angularly adjustable about said line and with respect to said arm, scale-and-pointer means associated with the arm to determine the angularity of said arm with respect to the plane of a said perch, and scale-and-pointer means associated with said head member to determine the angularity of said member with respect to a plane including said line and said base bar axis.

3. In apparatus for testing the angularity of the king-pin hole of an axle having spaced and planar spring perches, a testing head, a base bar carrying said head for adjustment relative thereto, base blocks carrying said base bar and seated on the respective perches, and means coactive between said base bar and said blocks to directly indicate the relative angularity of said spring perches about the longitudinal axis of the axle portion therebetween.

4. In a gauge for an axle having a king-pin hole, a test pin adapted to be positioned axially of said hole, a base bar adapted to be positioned parallel to the axle, a testing head comprising an arm pivoted with relation to said base bar, and a head member carried by said arm and angularly adjustable with relation thereto, said head member comprising a straight edge assembly for cooperation with said test pin, means associated with the head member for indicating the degree of angularity of said arm with relation to the base bar, and means associated with the head member for indicating the degree of angularity of said head member and straight edge with relation to said arm.

In testimony whereof, I affix my signature.

KATHERINE HENNINGS WEST,
*Executrix of the Last Will and Testament of John Walter West, Deceased.*